(12) United States Patent
McLaughlin et al.

(10) Patent No.: US 9,858,805 B2
(45) Date of Patent: Jan. 2, 2018

(54) REMOTE TERMINAL UNIT (RTU) WITH WIRELESS DIVERSITY AND RELATED METHOD

(71) Applicant: Honeywell International Inc., Morristown, NJ (US)

(72) Inventors: Paul F. McLaughlin, Ambler, PA (US); Alexander Chernoguzov, Warrington, PA (US); William Osei-Bonsu, Collegeville, PA (US)

(73) Assignee: Honeywell International Inc., Morris Plains, NJ (US)

( * ) Notice: Subject to any disclaimer, the term of this patent is extended or adjusted under 35 U.S.C. 154(b) by 868 days.

(21) Appl. No.: 14/035,557

(22) Filed: Sep. 24, 2013

(65) Prior Publication Data

US 2015/0084747 A1 Mar. 26, 2015

(51) Int. Cl.
| | |
|---|---|
| *G05B 11/01* | (2006.01) |
| *G08C 17/02* | (2006.01) |
| *G05B 19/418* | (2006.01) |
| *H04L 29/08* | (2006.01) |
| *H04L 29/06* | (2006.01) |
| *H04W 12/04* | (2009.01) |

(52) U.S. Cl.
CPC ......... *G08C 17/02* (2013.01); *G05B 19/4186* (2013.01); *H04L 67/12* (2013.01); *H04L 69/18* (2013.01); *G05B 2219/31257* (2013.01); *G05B 2219/33192* (2013.01); *H04W 12/04* (2013.01); *Y02P 90/185* (2015.11)

(58) Field of Classification Search
None
See application file for complete search history.

(56) References Cited

U.S. PATENT DOCUMENTS 5,095,417 A * 3/1992 Hagiwara ............. H04L 12/423
340/3.21
5,357,517 A * 10/1994 Takebe .................... H04L 43/00
340/3.43

(Continued)

FOREIGN PATENT DOCUMENTS

| JP | 2007527073 A | 9/2007 |
|---|---|---|
| JP | 4990755 B2 | 8/2012 |

(Continued)

OTHER PUBLICATIONS

U.S. Office Action issued for U.S. Appl. No. 13/908,977 dated Jan. 29, 2016, 14 pgs.

(Continued)

*Primary Examiner* — Curtis King (57) ABSTRACT

A method includes receiving first data from multiple wireless field devices at a remote terminal unit. The first data is received using multiple wireless communication protocols. The method also includes executing control logic at the remote terminal unit in order to control at least part of an industrial process. The method further includes communicating second data to the wireless field devices from the remote terminal unit. The second data is transmitted using the multiple wireless communication protocols. In addition, the method includes communicating at the remote terminal unit with a control system, where the remote terminal unit is at least partially controlled by the control system.

22 Claims, 4 Drawing Sheets

(56) References Cited

U.S. PATENT DOCUMENTS

| | | | |
|---|---|---|---|
| 6,639,806 B1 | 10/2003 | Chuang | |
| 7,555,004 B2 | 6/2009 | Orlik et al. | |
| 7,969,300 B2 | 6/2011 | Coronel et al. | |
| 8,072,098 B2 | 12/2011 | Elias et al. | |
| 8,239,046 B2* | 8/2012 | Koehler | G01D 3/08 |
| | | | 340/10.4 |
| 8,315,263 B2 | 11/2012 | Enns et al. | |
| 8,352,049 B2 | 1/2013 | Hsiung et al. | |
| 8,392,626 B2 | 3/2013 | Wormmeester et al. | |
| 8,583,067 B2 | 11/2013 | Budampatl et al. | |
| 8,656,065 B1 | 2/2014 | Gerhart et al. | |
| 8,667,091 B2 | 3/2014 | Almadi et al. | |
| 8,868,907 B2 | 10/2014 | Graham et al. | |
| 9,021,255 B1 | 4/2015 | Aharoni et al. | |
| 9,379,972 B2* | 6/2016 | Enns | H04L 45/52 |
| 2002/0147503 A1 | 10/2002 | Osburn, III | |
| 2003/0151513 A1* | 8/2003 | Herrmann | G08B 25/003 |
| | | | 340/573.1 |
| 2004/0259533 A1* | 12/2004 | Nixon | H04W 76/023 |
| | | | 455/414.1 |
| 2005/0174964 A1 | 8/2005 | Orlik et al. | |
| 2005/0216107 A1 | 9/2005 | O'Donnell | |
| 2005/0243867 A1* | 11/2005 | Petite | G01V 1/364 |
| | | | 370/474 |
| 2005/0273205 A1 | 12/2005 | Nickerson | |
| 2006/0087402 A1* | 4/2006 | Manning | G05B 19/41875 |
| | | | 340/3.1 |
| 2006/0202728 A1 | 9/2006 | Wich | |
| 2006/0240818 A1 | 10/2006 | McCoy et al. | |
| 2007/0280144 A1 | 12/2007 | Hodson et al. | |
| 2008/0077336 A1 | 3/2008 | Fernandes | |
| 2008/0080395 A1* | 4/2008 | Law | G05B 19/4186 |
| | | | 370/254 |
| 2009/0201150 A1* | 8/2009 | Becker | G08C 17/02 |
| | | | 340/539.21 |
| 2009/0224906 A1* | 9/2009 | Balgard | H04L 41/0809 |
| | | | 340/539.1 |
| 2009/0271558 A1 | 10/2009 | Wormmeester et al. | |
| 2009/0316628 A1 | 12/2009 | Enns et al. | |
| 2010/0079007 A1 | 4/2010 | Elias | |
| 2010/0176933 A1* | 7/2010 | Barragan Trevino | G06Q 10/00 |
| | | | 340/10.32 |
| 2011/0110291 A1* | 5/2011 | Ishii | H04B 7/155 |
| | | | 370/315 |
| 2011/0246791 A1 | 10/2011 | Kambayashi | |
| 2011/0276607 A1 | 11/2011 | Surna et al. | |
| 2012/0041574 A1 | 2/2012 | Hsiung et al. | |
| 2012/0063330 A1* | 3/2012 | Mori | H04L 41/12 |
| | | | 370/248 |
| 2012/0078869 A1* | 3/2012 | Bellville | G06F 17/30943 |
| | | | 707/706 |
| 2012/0084400 A1* | 4/2012 | Almadi | H04L 41/069 |
| | | | 709/219 |
| 2012/0151588 A1 | 6/2012 | Wang et al. | |
| 2012/0230446 A1* | 9/2012 | Feng | H04L 12/4625 |
| | | | 375/272 |
| 2012/0236768 A1* | 9/2012 | Kolavennu | H04W 76/023 |
| | | | 370/310 |
| 2012/0290735 A1 | 11/2012 | Johnson et al. | |
| 2013/0110998 A1* | 5/2013 | Zrelli | H04L 67/2823 |
| | | | 709/223 |
| 2013/0151849 A1 | 6/2013 | Graham et al. | |
| 2013/0173840 A1 | 7/2013 | Calvin | |
| 2013/0246801 A1 | 9/2013 | Takahashi | |
| 2013/0262064 A1 | 10/2013 | Mazzaro | |
| 2013/0307699 A1* | 11/2013 | Brekke | G05B 19/0421 |
| | | | 340/850 |
| 2013/0344839 A1* | 12/2013 | Roach | H04B 7/26 |
| | | | 455/344 |
| 2014/0119290 A1* | 5/2014 | Grewal | H04L 47/741 |
| | | | 370/329 |
| 2014/0232555 A1* | 8/2014 | Aakvaag | H04W 52/0209 |
| | | | 340/870.09 |
| 2014/0321443 A1* | 10/2014 | Samudrala | H04J 3/1694 |
| | | | 370/337 |
| 2015/0058480 A1* | 2/2015 | Allgaier | H04L 61/106 |
| | | | 709/224 |
| 2015/0278144 A1 | 10/2015 | Mclaughlin et al. | |
| 2015/0304193 A1* | 10/2015 | Ishii | G05B 19/4185 |
| | | | 709/224 |
| 2016/0048474 A1 | 2/2016 | Lv et al. | |

FOREIGN PATENT DOCUMENTS

| | | |
|---|---|---|
| JP | 201353730 A | 9/2013 |
| KR | 20100066815 A | 6/2010 |
| KR | 20120135142 A | 12/2012 |
| WO | WO 2005/086110 A2 | 9/2005 |
| WO | WO 2014/197182 A1 | 12/2014 |
| WO | WO 2015/047744 A1 | 4/2015 |

OTHER PUBLICATIONS

International Search Report dated Oct. 10, 2014 in connection with International Application No. PCT/US2014/038208; 3 pages.

Written Opinion of the International Searching Authority dated Oct. 10, 2014 in connection with International Application No. PCT/US2014/038208; 5 pages.

International Search Report dated Dec. 11, 2014 in connection with International Application No. PCT/US2014/055307; 4 pages.

Written Opinion of the International Searching Authority dated Dec. 11, 2014 in connection with International Application No. PCT/US2014/055307; 7 pages.

European Search Report dated Sep. 22, 2014 in connection with European Patent Application No. 14164273.6; 3 pages.

Non-Final Office Action dated Dec. 22, 2014 in connection with U.S. Appl. No. 13/908,977; 12 pages.

Final Office Action dated Jun. 10, 2015 in connection with U.S. Appl. No. 13/908,977; 13 pages.

Notification of Transmittal of the International Search Report and the Written Opinion of the International Searching Authority, or the Declaration dated Jun. 10, 2015 in connection with International Patent Application No. PCT/US2015/019671.

Office Action dated Aug. 2, 2016 in connection with U.S. Appl. No. 14/228,142.

International Search Report and Written Opinion dated Oct. 27, 2015 in connection with PCT/US2015/043607.

"25A Right Angle Signal/Power Combo", SAMTEC Power Strip 25, 2008, 1 page.

"FCN-RTU Low Power Autonomous Controller Hardware", STARDOM FCN-RTU, Yokogawa Electric Corporation, Dec. 2008, 13 pages.

"ControlWave Micro Process Automation Controller", Instruction Manual, Emerson Process Management, Jun. 2013, 170 pages.

Supplementary European Search Report dated Apr. 28, 2017 in connection with European Patent Application No. EP 14 84 8127.

David D. Brandt, "Solving the Issue of Interoperability among Devices and Systems", May 19, 2008, p. 1-21, XP055091082.

* cited by examiner

REMOTE TERMINAL UNIT (RTU) WITH WIRELESS DIVERSITY AND RELATED METHOD

TECHNICAL FIELD

This disclosure relates generally to industrial process control and automation systems. More specifically, this disclosure relates to a remote terminal unit (RTU) with wireless diversity and related method.

BACKGROUND

Wireless networks are frequently used in industrial process control and automation systems. For example, sensors could provide measurements over a wireless network, and actuators could receive control signals over the wireless network. Controllers can receive the sensor measurements and transmit the control signals over the wireless network.

A wireless network in an industrial facility often supports wireless devices that operate in accordance with a single wireless communication protocol. A conventional wireless network typically requires extensive hardware modifications in order to support wireless devices compatible with alternative communication protocols. Thus, additions or replacements of wireless devices in a particular industrial facility are typically allowed only if the new devices are compatible with an existing wireless communication protocol used in the industrial facility.

SUMMARY

This disclosure provides a remote terminal unit (RTU) with wireless diversity and related method.

In a first embodiment, a method includes receiving first data from multiple wireless field devices at a remote terminal unit. The first data is received using multiple wireless communication protocols. The method also includes executing control logic at the remote terminal unit in order to control at least part of an industrial process. The method further includes communicating second data to the wireless field devices from the remote terminal unit. The second data is transmitted using the multiple wireless communication protocols. In addition, the method includes communicating at the remote terminal unit with a control system, where the remote terminal unit is at least partially controlled by the control system.

In a second embodiment, an apparatus includes a remote terminal unit. The remote terminal unit includes at least one first interface configured to receive first data from multiple wireless field devices using multiple wireless communication protocols. The remote terminal unit also includes at least one processing device configured to execute control logic in order to control at least part of an industrial process. The remote terminal unit further includes at least one second interface configured to communicate with a control system, where the remote terminal unit is configured to be at least partially controlled by the control system. The at least one first interface is also configured to communicate second data to the wireless field devices using the multiple wireless communication protocols.

In a third embodiment, a non-transitory computer readable medium embodies a computer program. The computer program includes computer readable program code for receiving first data from multiple wireless field devices at a remote terminal unit using multiple wireless communication protocols. The computer program also includes computer readable program code for executing control logic at the remote terminal unit in order to control at least part of an industrial process. The computer program further includes computer readable program code for initiating communication of second data to the wireless field devices from the remote terminal unit using the multiple wireless communication protocols. In addition, the computer program includes computer readable program code for initiating communication at the remote terminal unit with a control system, where the remote terminal unit is configured to be at least partially controlled by the control system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
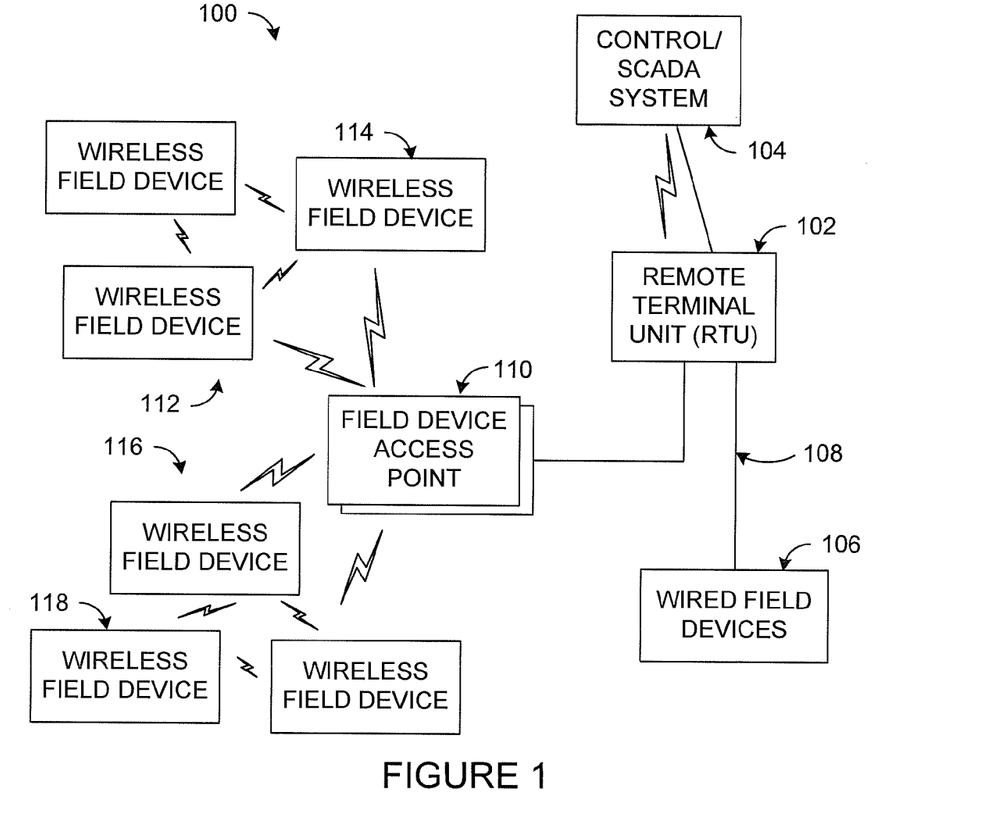
FIG. 1 illustrates an example industrial control and automation system having a remote terminal unit (RTU) with wireless diversity according to this disclosure.

FIG. 1 illustrates an example industrial control and automation system 100 having a remote terminal unit (RTU) 102 with wireless diversity according to this disclosure. Note that the remote terminal unit 102 may also be referred to in the art as a remote telemetry unit. Also note that while a single remote terminal unit 102 is shown here, the system 100 could include any number of remote terminal units 102 distributed in one or more geographical areas.

The remote terminal unit 102 represents a device or system that provides localized control and data access at a site that is remote from a control or supervisory control and data acquisition (SCADA) system 104 (referred to generally as a "control system"). For example, the remote terminal unit 102 could be positioned at or near an oil, gas, or water well or power substation. In these or other situations, the remote terminal unit 102 can be used to collect data from local sensors and process the data to generate control signals for local actuators. The remote terminal unit 102 can also interact with the control system 104 as needed. In this way, process control and automation functions can be provided at locations remote from the control system 104. The control system 104 is shown as communicating with the remote terminal unit 102 using wired and wireless connections, such as via serial or Ethernet communications and via microwave, cellular, or other radio frequency (RF) communications. For instance, the components 102-104 could ordinarily communicate using a wired connection with wireless communications used as backup. However, the remote terminal unit 102 could communicate with the control/SCADA system 104 over any suitable wireless or wired connection(s).

The remote terminal unit 102 can communicate with various industrial field devices. For example, the remote terminal unit 102 can communicate with one or more wired field devices 106 over one or more wired connections 108. The wired field devices 106 could represent sensors, actuators, or other industrial field devices. The wired connections 108 could represent serial connections (such as RS485 or RS422 connections), Ethernet connections, or other wired connections.

The remote terminal unit 102 can also communicate with various wireless industrial field devices via one or more field device access points (FDAPs) 110. Note that the connection(s) between the remote terminal unit 102 and the field device access point(s) 110 could be wired or wireless. The remote terminal unit 102 and the field device access points 110 have the ability to communicate with wireless field devices using different protocols. For example, the remote terminal unit 102 and the field device access points 110 could communicate with a first wireless field device network 112 containing wireless field devices 114 and with a second wireless field device network 116 containing wireless field devices 118. The field device networks 112 and 116 could support the use of different communication protocols. Note that while the networks 112 and 116 are shown as being separated here, the networks 112 and 116 could partially or completely overlap.

Each wireless field device 114, 118 could perform any desired function in the system 100. For example, the wireless field devices 114, 118 could include wireless sensors, wireless actuators, and other wireless industrial devices. The wireless field devices 114, 118 in the networks 112, 116 could support any suitable wireless communication protocols. In some embodiments, for instance, the wireless field devices 114 in the network 112 could support an ISA100.11a protocol, and the wireless field devices 118 in the network 116 could support a Wireless Highway Addressable Remote Transducer (WirelessHART) protocol.

As described in more detail below, the remote terminal unit 102 incorporates a wireless device manager (WDM) that facilitates communication with the wireless field devices 114 and 118 using different protocols. The remote terminal unit 102 with the wireless device manager can therefore both communicate using multiple protocols and manage wireless resources in multiple wireless networks. Additional details regarding the remote terminal unit 102 are provided below.

The remote terminal unit 102 includes any suitable structure for providing localized data access and control. The control system 104 includes any suitable structure(s) for providing industrial process control and automation. Each field device 106, 114, 118 includes any suitable structure for performing one or more operations related to industrial process control and automation, such as sensing or actuation. Each field device access point 110 represents any suitable structure providing wireless access to field devices.

Although FIG. 1 illustrates one example of an industrial control and automation system 100 having a remote terminal unit 102 with wireless diversity, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. As a specific example, the functionality of a field device access point 110 could be incorporated into the remote terminal unit 102. Further, while shown as being used with wired and wireless field devices, the remote terminal unit 102 could be used with only wireless field devices. In addition, FIG. 1 illustrates one example operational environment where the use of multiple wireless protocols in a remote terminal unit can be supported. This functionality could be used in any other suitable system.

Figure 2:
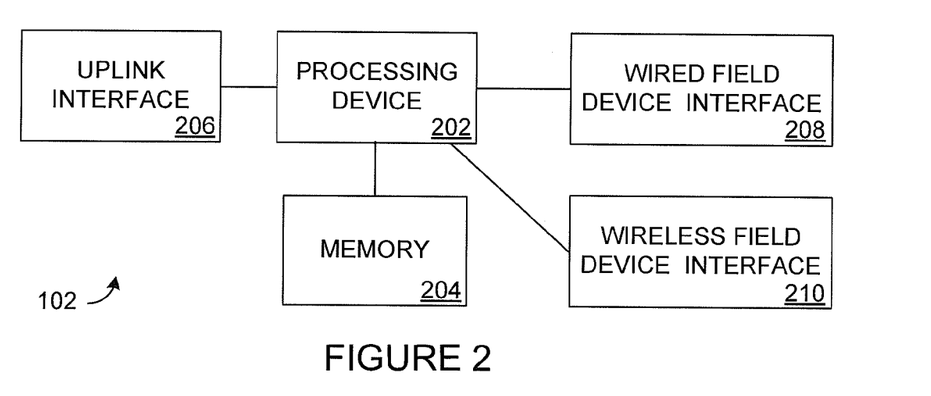
FIGS. 2 through 4 illustrate an example remote terminal unit with wireless diversity and related details according to this disclosure.
Figure 3:
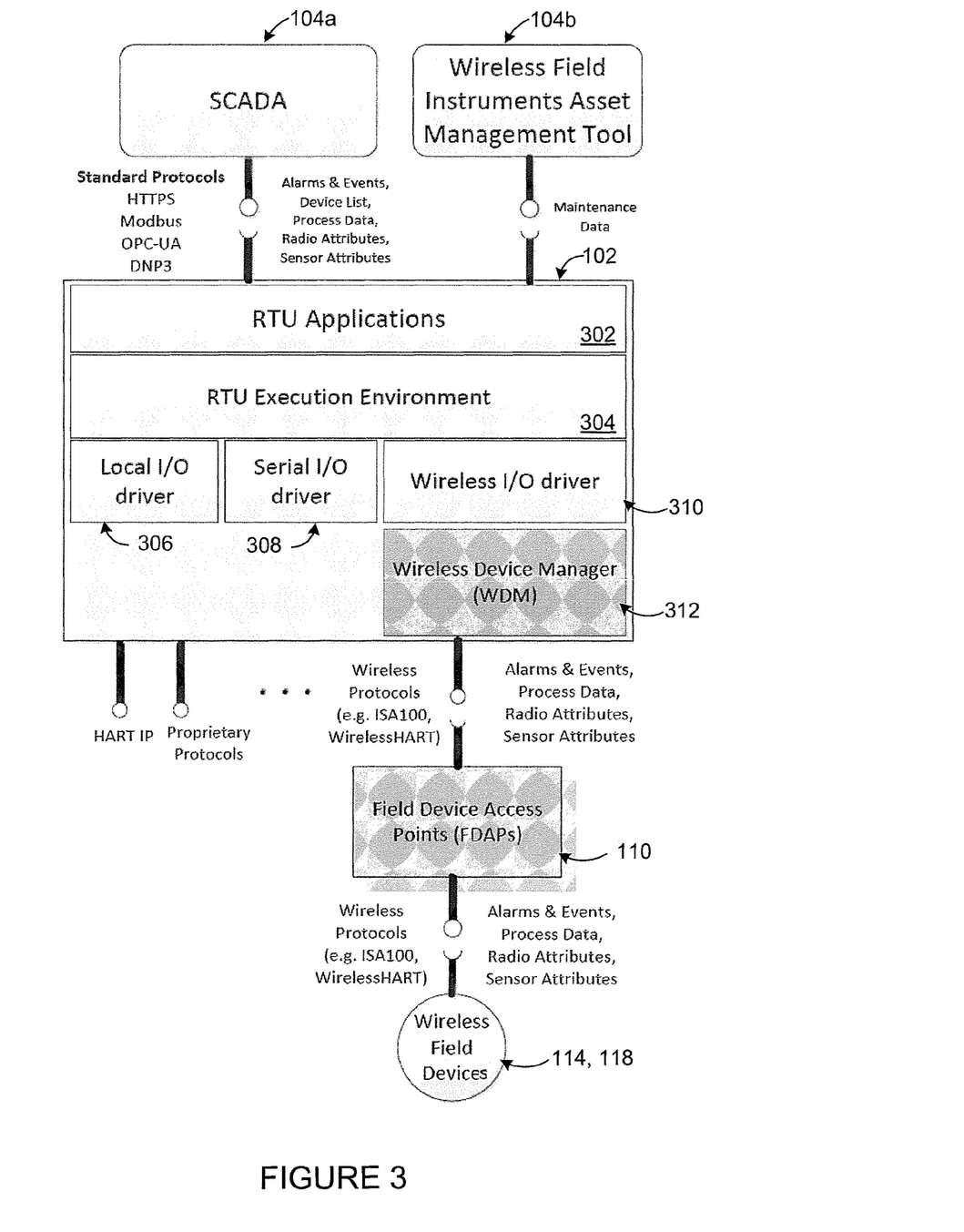
Figure 4:
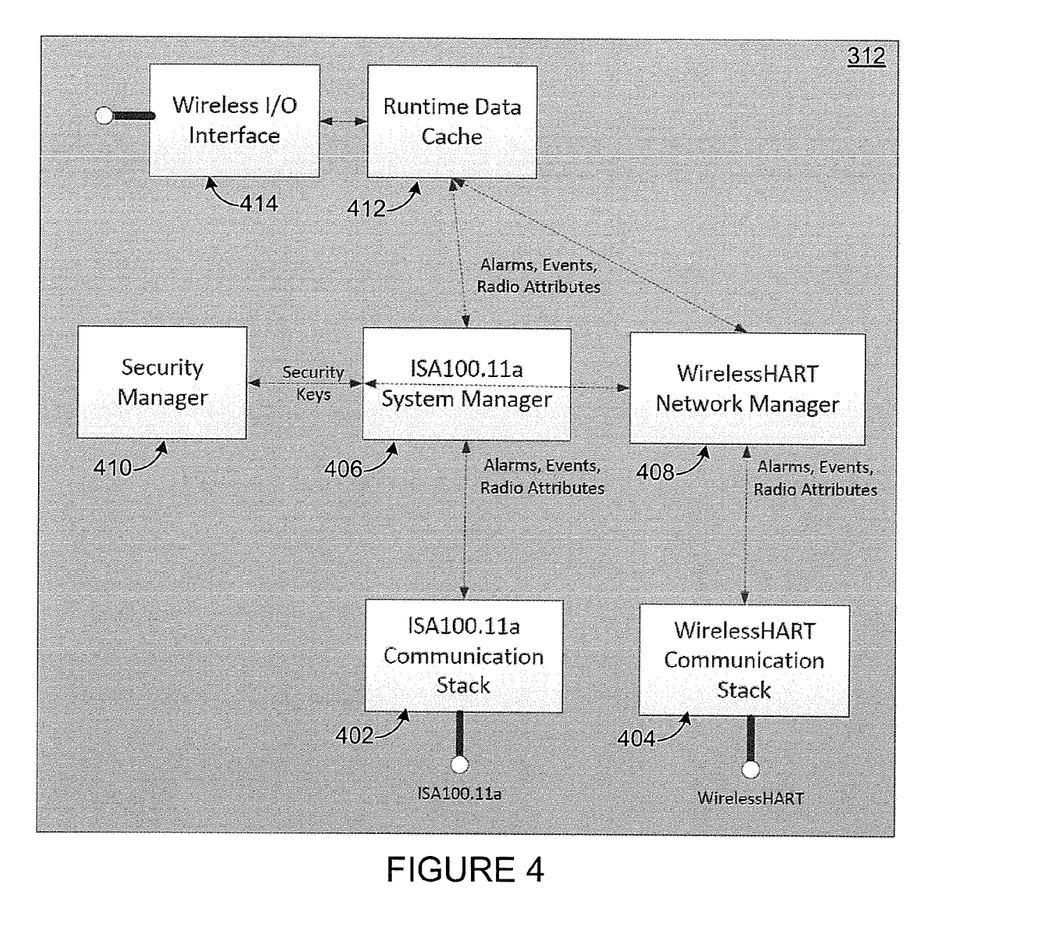

FIGS. 2 through 4 illustrate an example remote terminal unit 102 with wireless diversity and related details according to this disclosure. In particular, FIG. 2 illustrates an example hardware architecture of the remote terminal unit 102. As shown in FIG. 2, the remote terminal unit 102 includes at least one processing device 202, which controls the overall operation of the remote terminal unit 102. For example, the processing device 202 may receive or generate data to be transmitted, and the processing device 202 could provide the data to other component(s) in the remote terminal unit 102 for transmission over a wired or wireless network. The processing device 202 could also receive data over a wired or wireless connection and use or forward the data. As a particular example, the processing device 202 could receive or generate data for wireless field devices 114, 118 and format the data in different ways for communication using the appropriate wireless protocols.

The processing device 202 includes any suitable structure for controlling operation of a remote terminal unit. As particular examples, the processing device 202 could represent at least one microprocessor, microcontroller, field programmable gate array, digital signal processor, discreet logic device, or other processing or control device.

A memory 204 is coupled to the processing device 202. The memory 204 stores any of a wide variety of information used, collected, or generated by the remote terminal unit 102. For example, the memory 204 could store information received from or being transmitted to different field devices. The memory 204 includes any suitable volatile and/or non-volatile storage and retrieval device(s).

The remote terminal unit 102 further includes an uplink interface 206. The uplink interface 206 supports interaction between the remote terminal unit 102 and the control system 104 or other uplink device or system. The uplink interface 206 includes any suitable structure for supporting uplink communications, such as a serial or Ethernet transceiver and/or a microwave, cellular, or RF transceiver.

In addition, the remote terminal unit 102 includes at least one wired field device interface 208 and at least one wireless field device interface 210. Each interface 208-210 facilitates interaction between the remote terminal unit 102 and field devices. Each wired field device interface 208 includes any suitable structure facilitating communication with wired field devices, such as a serial interface. Each wireless field device interface 210 includes any suitable structure facilitating communication with wireless field devices, such as one or more wireless transceivers and antennas or other wired or wireless interfaces configured to communicate with one or more field device access points 110.

FIG. 3 illustrates an example software architecture of the remote terminal unit 102 within the system 100. As shown in FIG. 3, various types of data can be sent between the wireless field devices 114, 118 and the field device access points 110. For example, alarms and events can identify various conditions, such as various conditions that have met or exceeded certain thresholds.

Process data can be generated by wireless field devices 114, 118 to indicate conditions measured by the devices. For instance, process data can include measured values from sensors, such as temperature, pressure, flow rate, voltage, or current readings. Process data is typically distributed via data publication, although other distribution techniques could also be used.

Radio attributes typically represent configurations and settings related to wireless communications in the system 100. Radio attributes can be used by the remote terminal unit 102 to support and control wireless communications using limited bandwidths and frequencies.

Sensor attributes typically represent configurations and settings related to sensors that may be controlled. For example, if a wireless field device is a temperature sensor, sensor attributes could include a cold junction temperature and an indication of whether the device is in-service or out-of-service. Sensor attributes may generally represent parameters that are specific to the type or function of a device and are not related to network management.

As shown in FIG. 3, the field device access points 110 can communicate with the wireless field devices 114, 118 using multiple protocols. In this example, the protocols include an ISA100.11a protocol and a WirelessHART protocol. However, any other or additional protocol(s) could be supported by the field device access points 110. Note that multiple protocols could be supported by separate transceivers in each device or by a common transceiver in each device, such as a single transceiver with a time division multiple access (TDMA) scheme. Details of using a common transceiver with multiple protocols are provided in U.S. patent application Ser. No. 13/871,897, which is hereby incorporated by reference in its entirety.

Communications between the remote terminal unit 102 and the field device access points 110 can involve the same types of data, such as alarms and events, process data, radio attributes, and sensor attributes. As shown in FIG. 3, the remote terminal unit 102 can communicate with the field device access points 110 using multiple protocols. In this example, the protocols include an ISA100.11a protocol and a WirelessHART protocol. However, any other or additional protocol(s) could be supported by the remote terminal unit 102. Again, the multiple protocols could be supported by multiple transceivers or a common transceiver in each device.

In this example, the control system 104 is shown as including a SCADA system 104a and a wireless field instrument asset management tool 104b. The management tool 104b could support various functions to manage wireless field devices, such as functions for configuring, commissioning, maintaining, and diagnosing smart field instruments. Communications between the remote terminal unit 102 and the components 104a-104b can again involve the same types of data. The remote terminal unit 102 and the SCADA system 104a can also exchange device lists, and the remote terminal unit 102 and the management tool 104b can also exchange maintenance data. The device lists can identify various devices, such as the field devices, that communicate with the remote terminal unit 102. The maintenance data can be used to set up and maintain the field devices. Communications between the remote terminal unit 102 and the components 104a-104b can use any suitable format(s) or protocol(s). In this example, the formats or protocols include hypertext transfer protocol secure (HTTPS), MODBUS, OLE for Process Control Unified Architecture (OPC-UA), and Distributed Network Protocol 3 (DNP3). Note, however, that any other or additional format(s) or protocol(s) could be used.

As shown in FIG. 3, the remote terminal unit 102 supports one or more higher-level RTU applications 302. These applications 302 implement higher-level functions within the remote terminal unit 102. For example, the applications 302 could define the process control functions implemented by the remote terminal unit 102 and functions for interacting with the components 104a-104b. As a particular example, the applications 302 could define how data from sensor field devices are processed to generate control signals for actuator field devices. Any other or additional applications 302 could be supported by the remote terminal unit 102.

An RTU execution environment 304 supports features that are used by other programs executed by the remote terminal unit 102. For example, the RTU execution environment 304 could represent software routines that are callable by other programs in the remote terminal unit 102, such as the applications 302. As particular examples, the RTU execution environment 304 could allow the applications 302 to interact with field devices via lower layers of the remote terminal unit 102.

The remote terminal unit 102 further supports multiple input/output (I/O) drivers for communicating with other components in the system 100. In this example, the remote terminal unit 102 includes at least one local I/O driver 306, at least one serial I/O driver 308, and at least one wireless I/O driver 310. Each local I/O driver 306 denotes a driver that facilitates communication with field devices connected directly to the remote terminal unit 102. As examples, the local I/O driver 306 could support communications using the HART IP protocol or one or more proprietary protocols. Each serial I/O driver 308 denotes a driver that facilitates communication with field devices connected to the remote terminal unit 102 by a serial bus, such as an RS422 or RS485 bus. Each wireless I/O driver 310 denotes a driver that facilitates wireless communication with field devices.

In addition, the remote terminal unit 102 includes a wireless device manager (WDM) 312. The wireless device manager 312 manages the wireless networks 112, 116. The wireless device manager 312 also supports the caching of data received or to be transmitted using different wireless protocols. Received data that is cached can be provided to an external client, such as to the applications 302 via the wireless I/O interface 310, regardless of the protocol or protocols in which the cached data was received.

FIG. 4 illustrates an example implementation of the wireless device manager 312 in a remote terminal unit 102. The wireless device manager 312 includes various components, each of which could be implemented using hardware and/or software or firmware instructions (which can be executed by a hardware platform). Note that while these components are shown as forming a centralized wireless device manager 312, the components in FIG. 4 could be divided and executed on multiple platforms in a distributed manner.

As shown in FIG. 4, the wireless device manager 312 includes multiple protocol stacks 402-404, each of which is associated with a different wireless communication protocol. In this example, the protocol stacks include an ISA100.11a protocol stack 402 and a WirelessHART protocol stack 404. The protocol stacks 402-404 are used to exchange process data, sensor attributes, and other data with wireless field devices. Each communication stack 402-404 supports the various functional layers needed to communicate using an industrial wireless protocol. For example, the communication stacks 402-404 could include the physical, data link, network, transport, and other layers for supporting communications using the ISA100.11a and WirelessHART protocols.

The protocol stacks 402-404 can exchange alarms, events, radio attributes, security keys, and other data with two managers 406-408, respectively. The managers 406-408 are associated with different communication protocols. The manager 406 here represents an ISA100.11a system manager used to manage an ISA100.11a network, and the manager 408 here represents a network manager used to manage a WirelessHART network. The managers 406-408 can perform various functions to support the management of ISA100.11a and WirelessHART networks, such as allowing nodes to join the networks and performing security validation. The managers 406-408 can also manage the radio attributes of devices connected to the wireless networks.

A security manager 410 can be used to provide security keys or other wireless network credentials. In some embodiments, the security manager 410 can act as a centralized security repository for all wireless field devices, regardless of which protocols are used by the wireless devices. This can help to avoid the need to maintain separate sets of security keys for devices that use different protocols. The security manager 410 can provide the security keys or other wireless network credentials to the managers 406-408, which can use the security keys to manage the different wireless networks.

A runtime data cache 412 is used to temporarily store data being transferred between a wireless I/O interface 414 and the communication stacks 402-404. The wireless I/O interface 414 represents an interface that can interact with the wireless I/O driver 310 shown in FIG. 3. The runtime data cache 412 stores any suitable data, such as alarms, events, and radio attributes, being transferred between the communication stacks 402-404 and the wireless I/O interface 414. Data can be stored in the runtime data cache 412 in any suitable format, such as a unified format that is the same regardless of the wireless protocol associated with the data. The use of a unified format is described in more detail in U.S. patent application Ser. No. 13/908,977, which is hereby incorporated by reference in its entirety. The runtime data cache 412 could represent a portion of the memory 204.

In this way, multiple protocols could be supported by a remote terminal unit 102 in order to communicate with multiple wireless field device networks. This can enable easier integration of wireless field devices with remote terminal units in a control system.

Although FIGS. 2 through 4 illustrate one example of a remote terminal unit 102 with wireless diversity and related details, various changes may be made to FIGS. 2 through 4. For example, various components in FIGS. 2 through 4 could be omitted, combined, or further subdivided and additional components could be used according to particular needs.

Figure 5:
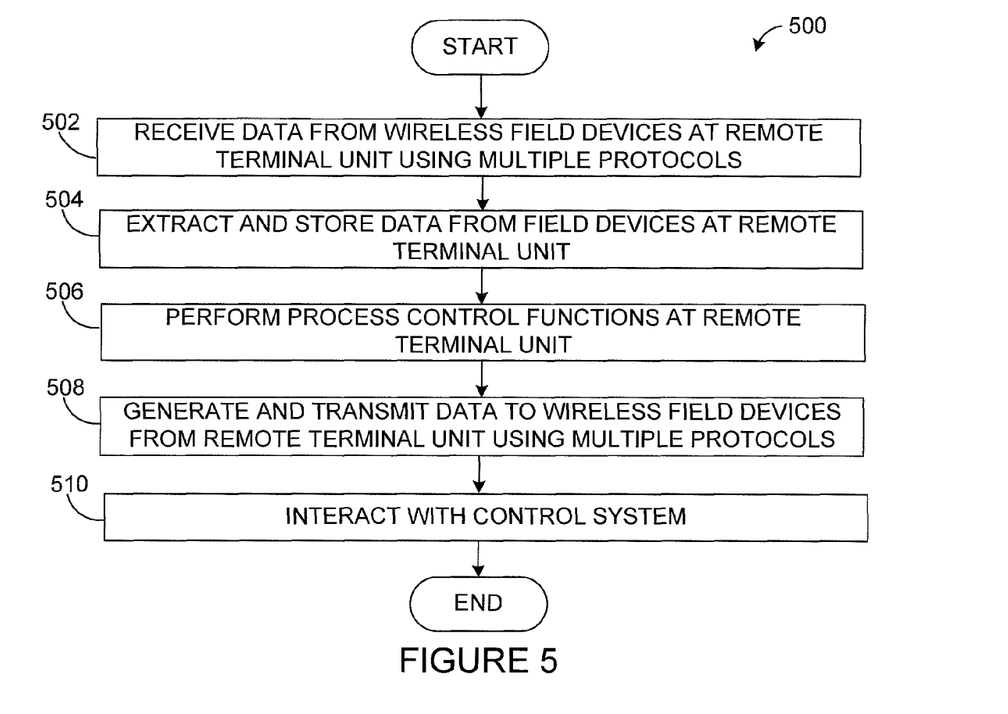
FIG. 5 illustrates an example method for using a remote terminal unit with wireless diversity according to this disclosure.

FIG. 5 illustrates an example method 500 for using a remote terminal unit 102 with wireless diversity according to this disclosure. The method 500 could, for example, be performed using the remote terminal unit 102 in the system 100 of FIG. 1. However, the method 500 could involve any other suitable remote terminal unit in any suitable system.

Data is received at a remote terminal unit from wireless field devices using multiple protocols at step 502. This could include, for example, the communication stacks 402-404 in the remote terminal unit 102 receiving process data and other data from sensor field devices 114, 118 or other field devices using ISA100.11a, WirelessHART, and/or other protocols. The differences between the protocols and the differences between the individual field devices create differences in the data received from the field devices, even when the wireless devices measure similar phenomena.

The received data is extracted and stored at step 504. This could include, for example, the communication stacks 402-404 extracting data from the received data messages and storing the data in the memory 204. This could also include the managers 406-408 storing the data in the runtime data cache 412. The location(s) where the data is stored can vary depending on the intended usage of the data.

Process control functions are performed at the remote terminal unit at step 506. This could include, for example, the processing device(s) 202 executing control logic to determine how to adjust an industrial process based on the received data. As a particular example, this could include the processing device(s) 202 executing control logic to determine how to adjust equipment associated with an oil, gas, or water well or power substation.

Data is generated and transmitted to the wireless field devices from the remote terminal unit using multiple protocols at step 508. This could include, for example, the processing device(s) 202 generating control signals for adjusting actuator field devices. This could also include the communication stacks 402-404 preparing and transmitting the control data and other data to actuator field devices 114, 118 or other field devices using ISA100.11a, WirelessHART, and/or other protocols.

During this time, the remote terminal unit interacts with a separate control system at step 510. This could include, for example, the remote terminal unit 102 communicating with the control system 104 via the uplink interface 206. The remote terminal unit 102 could provide data to the control system 104, such as data from sensors or control signals generated for actuators. The remote terminal unit 102 could also receive data from the control system 104, such as control signals for actuators or setpoints for control logic. In some embodiments, the control system 104 controls the overall operation of the remote terminal unit 102. Data transported to and from the control system 104 can be stored in the runtime data cache 412.

Although FIG. 5 illustrates one example of a method 500 for using a remote terminal unit 102 with wireless diversity, various changes may be made to FIG. 5. For example, while shown as a series of steps, various steps in FIG. 5 could overlap, occur in parallel, occur in a different order, or occur multiple times.

Figure 6:
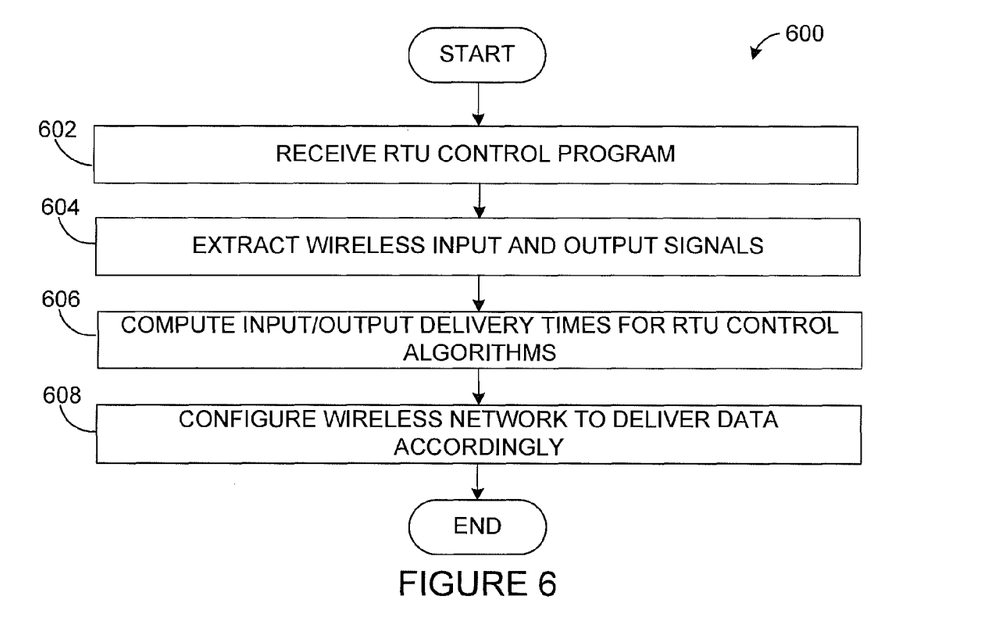
FIG. 6 illustrates an example method for wireless input/output scheduling for a remote terminal unit according to this disclosure.

FIG. 6 illustrates an example method 600 for wireless input/output (I/O) scheduling for a remote terminal unit according to this disclosure. The method 600 could, for example, be performed using the remote terminal unit 102 in the system 100 of FIG. 1. However, the method 600 could involve any other suitable remote terminal unit in any suitable system.

As shown in FIG. 6, an RTU control program is received at step 602. This could include, for example, the remote terminal unit 102 receiving one or more RTU control algorithms from an RTU builder, which represents an application used by an operator to define the functionality of the remote terminal unit 102. The RTU builder could represent an application executed in the control system 104 or other suitable location.

Wireless input and output signals are extracted at step 604. This could include, for example, the processing device(s) 202 in the remote terminal unit 102 identifying the input signals to be received wirelessly and the output signals to be transmitted wirelessly using the RTU control algorithms. This information informs the remote terminal unit 102 about the signals to be handled by the remote terminal unit 102 during process control.

Input/output delivery times for the RTU control algorithms are identified at step 606. This could include, for example, the processing device(s) 202 in the remote terminal unit 102 identifying timing requirements for the receipt of input wireless signals and the delivery of output wireless signals required by the RTU control algorithms. The timing requirements can be associated with any suitable functionality, such as timing requirements for receiving inputs from wireless sensors and timing requirements for delivering control signals to wireless actuators.

At least one wireless network is configured to deliver data accordingly at step 608. This could include, for example, establishing wireless connections between devices in the wireless network 112 or 116 in order to deliver data to or from the remote terminal unit 102 in accordance with the identified timing requirements. The wireless network(s) could be configured via one or more of the managers 406-408.

In this way, the remote terminal unit 102 is able to synchronize wireless communications (such as data publications) with the execution of the RTU control algorithms. This can enable more effective control over an industrial process and help to ensure compliance with various control algorithms' timing requirements.

Although FIG. 6 illustrates one example of a method 600 for wireless input/output (I/O) scheduling for a remote terminal unit, various changes may be made to FIG. 6. For example, while shown as a series of steps, various steps in FIG. 6 could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving first data from different ones of multiple wireless field devices at a remote terminal unit, the first data received using different ones of multiple wireless communication protocols that are supported by a common transceiver;
executing control logic at the remote terminal unit to generate control signals for one or more actuator field devices using data from one or more sensor field devices in order to control at least part of an industrial process;
communicating second data to the wireless field devices from the remote terminal unit using the common transceiver, the second data transmitted using the different ones of the multiple wireless communication protocols; and
communicating at the remote terminal unit with a control system, the remote terminal unit at least partially controlled by the control system.

2. The method of claim 1, further comprising:
managing wireless resources in multiple wireless networks using the remote terminal unit, the multiple wireless networks associated with the multiple wireless communication protocols.

3. The method of claim 2, wherein managing the wireless resources comprises configuring the wireless networks to synchronize wireless communications with execution of one or more control algorithms by the remote terminal unit.

4. The method of claim 2, wherein managing the wireless resources comprises using an ISA100.11a system manager and a Wireless Highway Addressable Remote Transducer (WirelessHART) network manager at the remote terminal unit.

5. The method of claim 4, wherein:
receiving the first data and communicating the second data comprise using multiple communication stacks, each communication stack associated with one of the wireless communication protocols; and
using the multiple communication stacks comprises communicating via a first of the communication stacks using the ISA100.11a system manager and communicating via a second of the communication stacks using the WirelessHART network manager.

6. The method of claim 4, further comprising:
distributing wireless security keys to the ISA100.11a system manager and the WirelessHART network manager using a security manager at the remote terminal unit.

7. The method of claim 1, wherein communicating with the control system comprises:
storing third data being communicated between the remote terminal unit and the control system in a runtime data cache.

8. The method of claim 1, wherein the multiple wireless field devices include at least one of the one or more sensor field devices or at least one of the one or more actuator field devices.

9. An apparatus comprising a remote terminal unit, the remote terminal unit comprising:
a common transceiver configured to receive first data from different ones of multiple wireless field devices using different ones of multiple wireless communication protocols;
at least one processing device configured to execute control logic to generate control signals for one or more actuator field devices using data from one or more sensor field devices in order to control at least part of an industrial process; and
at least one second interface configured to communicate with a control system, the remote terminal unit configured to be at least partially controlled by the control system;
wherein the common transceiver is also configured to communicate second data to the wireless field devices using the different ones of the multiple wireless communication protocols.

10. The apparatus of claim 9, wherein the at least one processing device is further configured to manage wireless resources in multiple wireless networks, the multiple wireless networks associated with the multiple wireless communication protocols.

11. The apparatus of claim 10, wherein the at least one processing device is configured to manage the wireless resources in order to configure the wireless networks to synchronize wireless communications with execution of one or more control algorithms by the remote terminal unit.

12. The apparatus of claim 10, wherein the at least one processing device is configured to implement an ISA100.11a system manager and a Wireless Highway Addressable Remote Transducer (WirelessHART) network manager.

13. The apparatus of claim 12, wherein:
the remote terminal unit is further configured to support multiple communication stacks, each communication stack associated with one of the wireless communication protocols;
the ISA100.11a system manager is configured to communicate via a first of the communication stacks; and
the WirelessHART network manager is configured to communicate via a second of the communication stacks.

14. The apparatus of claim 12, wherein the at least one processing device is configured to implement a security manager configured to distribute wireless security keys to the ISA100.11a system manager and the WirelessHART network manager.

15. The apparatus of claim 9, further comprising:
a memory including a runtime data cache configured to store third data communicated between the remote terminal unit and the control system.

16. A non-transitory computer readable medium embodying a computer program, the computer program comprising computer readable program code that when executed causes at least one processing device to:
receive first data from different ones of multiple wireless field devices at a remote terminal unit using different ones of multiple wireless communication protocols that are supported by a common transceiver;
execute control logic at the remote terminal unit to generate control signals for one or more actuator field devices using data from one or more sensor field devices in order to control at least part of an industrial process;
initiate communication of second data to the wireless field devices from the remote terminal unit using the common transceiver and the different ones of the multiple wireless communication protocols; and
initiate communication at the remote terminal unit with a control system, the remote terminal unit configured to be at least partially controlled by the control system.

17. The non-transitory computer readable medium of claim 16, wherein the computer program further comprises computer readable program code that when executed causes the at least one processing device to:
manage wireless resources in multiple wireless networks using the remote terminal unit, the multiple wireless networks associated with the multiple wireless communication protocols.

18. The non-transitory computer readable medium of claim 17, wherein the computer readable program code that when executed causes the at least one processing device to manage the wireless resources comprises:
computer readable program code that when executed causes the at least one processing device to configure the wireless networks to synchronize wireless communications with execution of one or more control algorithms by the remote terminal unit.

19. The non-transitory computer readable medium of claim 17, wherein the computer readable program code that when executed causes the at least one processing device to manage the wireless resources comprises:
computer readable program code implementing an ISA100.11a system manager and a Wireless Highway Addressable Remote Transducer (WirelessHART) network manager.

20. The non-transitory computer readable medium of claim 19, wherein the computer readable program code that when executed causes the at least one processing device to receive the first data and the computer readable program code that when executed causes the at least one processing device to initiate communication of the second data comprise:
computer readable program code that when executed causes the at least one processing device to use multiple communication stacks, each communication stack associated with one of the wireless communication protocols.

21. The non-transitory computer readable medium of claim 19, wherein the computer readable program code that when executed causes the at least one processing device to manage the wireless resources further comprises:
computer readable program code that when executed causes the at least one processing device to distribute wireless security keys to the ISA100.11a system manager and the WirelessHART network manager.

22. The non-transitory computer readable medium of claim 16, wherein the computer program further comprises computer readable program code that when executed causes the at least one processing device to:
   store third data being communicated between the remote terminal unit and the control system in a runtime data cache.

\* \* \* \* \*